United States Patent [19]

Bayerstock

[11] Patent Number: 4,894,067
[45] Date of Patent: Jan. 16, 1990

[54] LOW PROFILE GASEOUS FUEL CARBURETOR

[75] Inventor: Richard Bayerstock, Long Beach, Calif.

[73] Assignee: Carbumatic B.V., Rijswiik, Netherlands

[21] Appl. No.: 121,981

[22] Filed: Nov. 18, 1987

[51] Int. Cl.[4] .................. F02M 21/04; G05G 7/02
[52] U.S. Cl. .................... 48/180.1; 48/184; 74/470; 74/582; 123/527
[58] Field of Search ............... 48/180.1, 184; 261/41.4, 44.8, 51, 78.2; 74/470, 582; 123/527, 190 R

[56] References Cited
U.S. PATENT DOCUMENTS

| | | | |
|---|---|---|---|
| 1,432,751 | 10/1922 | Hallett | 48/180.1 |
| 1,552,886 | 9/1925 | Shultz | 74/582 |
| 2,178,538 | 11/1939 | Erbguth | 74/582 |
| 2,881,063 | 4/1959 | Butterworth | 48/180.1 |
| 2,924,514 | 2/1960 | Neubauer | 48/180.1 |
| 3,049,415 | 8/1962 | Hansen | 48/180.1 |
| 3,132,009 | 5/1964 | Boyd | 48/180.1 |
| 3,257,852 | 6/1966 | Perkins | 74/470 |
| 3,484,220 | 12/1969 | Jones | 47/180.1 |

Primary Examiner—Joye L. Woodard
Attorney, Agent, or Firm—Donald D. Mon

[57] ABSTRACT

A low profile gaseous fuel carburetor provided with deflector valves to improve mixing of gas and air in a mixture stream of short length. It also shows improved idling and starter valves, and a link for a parallelogram throttle linkage that maintains a correct lever relationship despite operational wear.

10 Claims, 2 Drawing Sheets

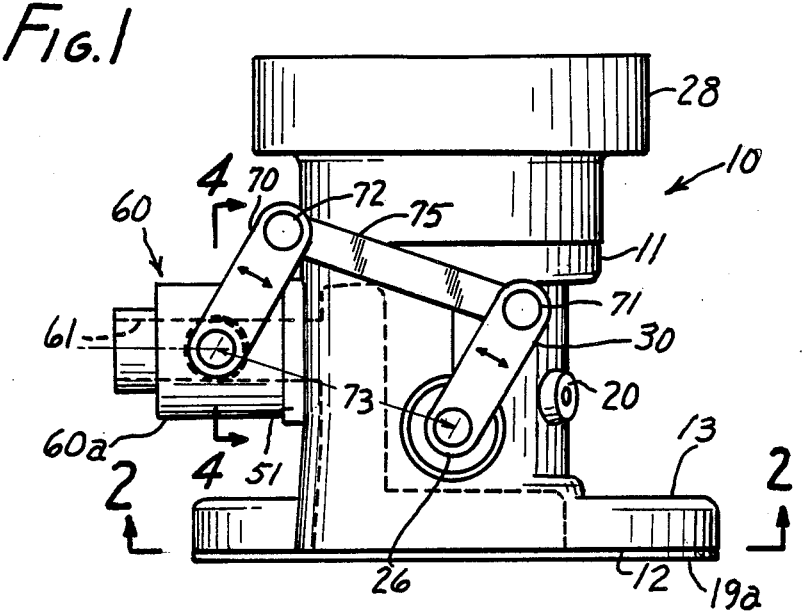
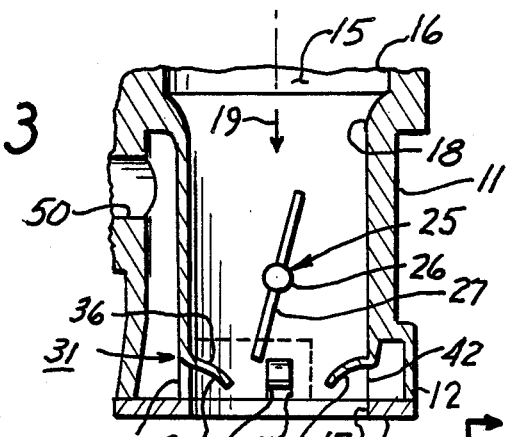
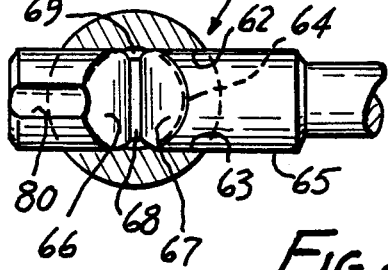
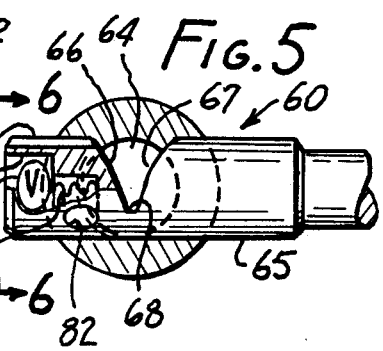
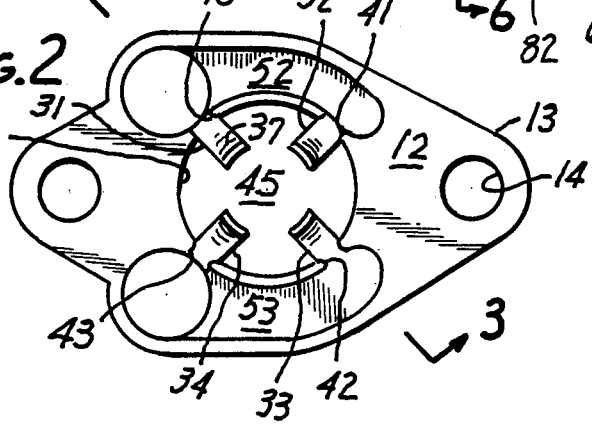
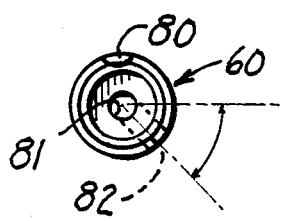

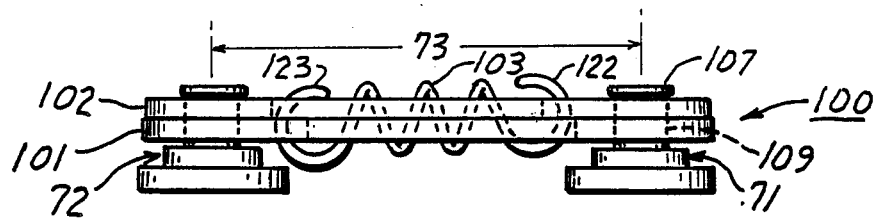
Fig.7
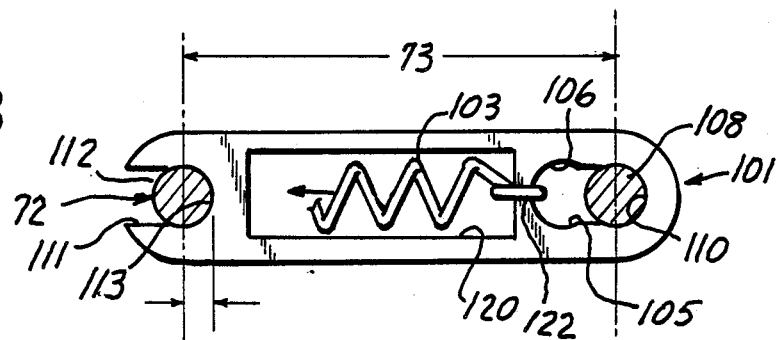
Fig.8
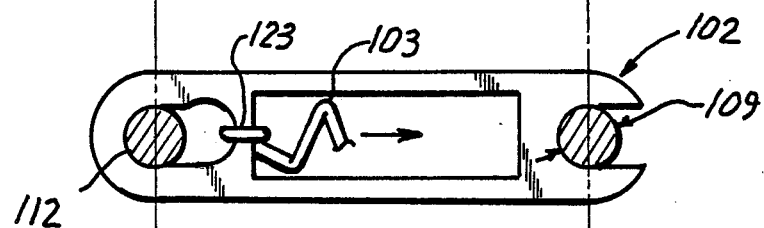
Fig.9
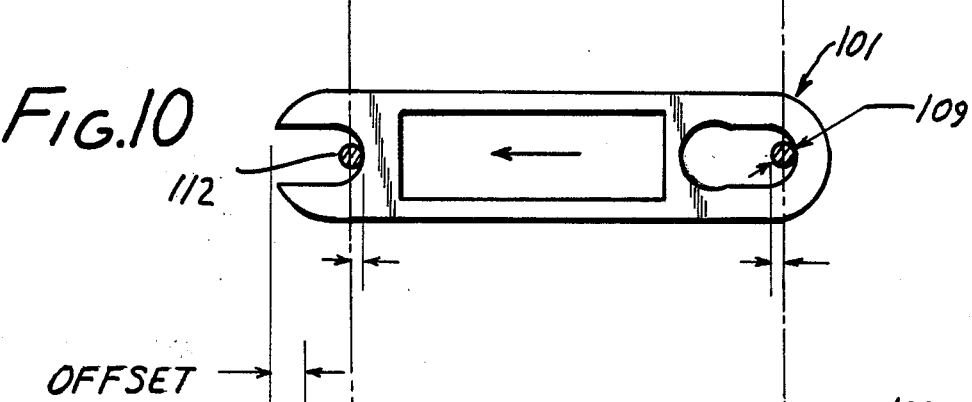
Fig.10
OFFSET
Fig.11
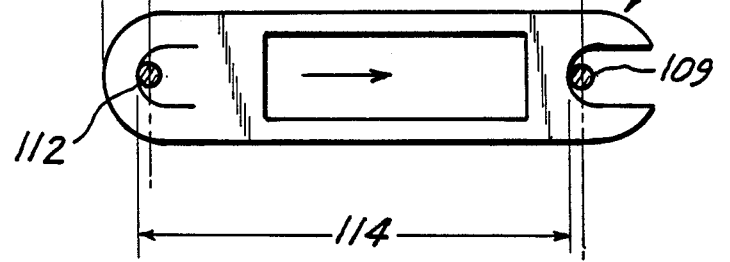

LOW PROFILE GASEOUS FUEL CARBURETOR

FIELD OF THE INVENTION

This invention relates to carburetors for engines powered by gaseous fuels, and especially to an efficient gaseous fuel carburetor with a low profile.

BACKGROUND OF THE INVENTION

Carburetors for supplying mixtures of air and gaseous fuels are known. Their function is to provide throttling means and a responsive metering valve to supply a mixture of suitable richness and quantity to operate the engine at required loads and engine speeds.

This is an old art whose fortunes vary with the relative cost of gasoline and of gaseous fuels such as liquefied petroleum gas or natural gas. They also vary with environmental concerns. For example, even when gaseous fuels cost considerably more than gasoline, their use is still compelled for indoor engine operations. One example is the indoor warehouse forklift where the pollutants from gasoline engines are not tolerated, and the alternatives are battery power or gaseous fuels.

Because of the continuing demand for gaseous fuel carburetors, however variable the demand may be, the art has been crowded with efforts to make a carburetor which is alertly responsive to wide ranges of operating demands and ambient conditions such as atmospheric pressure. Generally the developments have utilized increasingly complicated regulators and metering valves. Their complexity has resulted in higher prices, marginally acceptable exhaust pollution emission, and mechanical performance which degrades with long-continued usage. They also have tended to be quite bulky.

Newer vehicles, especially forklifts, allow very little headroom for the carburetor. Conventional systems inherently have had to be bulky, with a relatively high profile. The carburetor of this invention can supply the demands of a 45 HP engine with a head height of only about three inches. Its other dimensions are similarly minimized. Such small dimensions for its envelope are an important improvement.

Especially for indoor operation, the generation of carbon monoxide is not tolerable. A nearly stoichiometric mixture must be burned efficiently. Slowly degrading performance and frequent adjustments are not considered to be too objectionable in many installations, such as in trucks and automobiles. However, in others they render a carburetor unacceptable. For example, forklift trucks are operated for months at a time without much engine maintenance. This tendency is so pronounced that when forklift carburetors are tested by air quality districts for qualification they must be operated for as long as six months without adjustment, and still perform acceptably. In the course of this extended testing, there is ample opportunity for valves and linkages to wear, and for any latent design defects which would result in improper mixtures to become apparent.

It is another object of this invention to provide valves and linkages which are self-compensating for wear so as to function efficiently without external adjustments for an extended period of time.

Although one might theorize that uniform mixing of a gaseous fuel in an airstream in inherently simple, and is greatly simpler than mixing gasoline into an airstream, this is not the case. Mixing gaseous fuel and vaporizing gasoline involve many of the same problems. One problem arises from the fact that the velocity of the airstream through the carburetor venturi is much faster in the center of the stream than nearer to the wall, where it may be nearly stagnant. Getting the fuel into the total airstream—through the slower and into the faster regions, and mixing well with both, is a considerable problem. The injection of the gaseous fuel into the airstream to produce a uniform mixture has often been attained only at the cost of a longer passage in which to mix the gas and air, resulting in a taller carburetor.

Good mixing is required not only for proper combustion, but also for proper distribution of the charge among the cylinders. When the stream of mixture enters the manifold, it divides to the various cylinders, and if the dividing gases are not uniformly mixed relative to one another, imbalance among the cylinders will result.

It is another object of this invention to provide means for improving the uniformity of mixture in a relatively short path length, thereby enabling a carburetor of lower profile to be made.

BRIEF DESCRIPTION OF THE INVENTION

A carburetor according to this invention comprises a body with a passage having an air intake port and a mixture outlet port. Between the intake and outlet ports there is a venturi. A throttle valve such as a butterfly is fitted in the passage.

A plurality of gas injector ports enters the passage through the passage wall immediately downstream from the throttle valve. These ports are at least partially overhung by an equal number of deflector vanes that project from the wall immediately upstream from the injector ports, and extend toward the center of the passage. The deflector vanes have a face that faces upstream, each of which extends inwardly as its extends from the wall, and downstream. The deflector vanes are angularly spaced apart to leave spacings for linear air flow between them, and their free ends are spaced from one another so as to leave a central region of unimpeded air flow.

The downstream-facing faces of the deflector vanes slope inwardly from the wall, and downstream, so as to provide regions inwardly from the injector ports that are sheltered from the linear air flow so as to direct at least some of the gas, undiluted by air, toward the center of the passage.

A metering valve is mounted to the body. It has an inlet port, a valving chamber, and an outlet port in that order. The outlet port discharges to conduitry that connects to the injector ports. The valving chamber is cylindrical, and houses a valve rotor. The rotor has a central axis of rotation and a peripheral wall which makes a valving contact with the chamber wall at a valving port in the chamber wall. The valving port is contoured—usually a circular section entering a circular cylinder. A single valving notch is formed in the rotor wall. The notch is a modified V shape with a contoured edge that narrows toward the central axis. It is aligned with the valving port when fully open, and except for a small region for idling operations closes the valving port when in its closed position.

A starter by-pass groove extends axially in the rotor wall, communicating with the inlet port when the rotor is in its idling (and starting) position. The groove is fluidly connected to a by-pass passage in the rotor leading to the valving port when the rotor is in its idling position. A spring-loaded poppet closes the by-pass passage when the manifold vacuum is of such value as to indicate that the engine has started.

The valve rotor and the throttle valve each have centers of rotation, and a respective operating lever. Those levers are joined by a compensating linkage that maintains the spacing of centers on the operating levers constant regardless of linkage wear so as to constitute a parallelogram movement despite wear in the linkage.

The above and other features of this invention will be fully understood from the following detailed description and the accompanying drawings, in which:

BRIEF DESCRIPTION OF THE DRAWINGS

FIG. 1 is a side view of a carburetor according to the invention;

FIG. 2 is a bottom view taken at line 2—2 in FIG. 1;

FIG. 3 is a cross-section taken at line 3—3 in FIG. 2;

FIG. 4 is a cross-section taken at line 4—4 in FIG. 1;

FIG. 5 is a view similar to FIG. 4 with the valve in a different setting;

FIG. 6 is a partial end view taken at line 6—6 in FIG. 5;

FIG. 7 is an edge view of a preferred link for use in the invention; and

FIG. 8-11 are fragmentary side views explaining the functioning of the link of FIG. 7.

DETAILED DESCRIPTION OF THE INVENTION

A carburetor 10 according to this invention is shown in FIG. 1. It includes a body 11 having a base 12 with a flange 13 adapted to fit on an intake manifold (not shown). Mounting holes 14 pass bolts (not shown) to hold the carburetor to the manifold.

As best shown in FIGS. 1 and 3, a passage 15 extends from an air intake port 16 to a mixture outlet port 17. A venturi 18, comprising a region of reduced diameter, is disposed between these ports. An axis of downstream flow 19 is shown.

A closure plate 19a closes a portion of the lower end of the body and when installed fits against the manifold.

A vacuum port 20 provides access to the pressure in the throat of the venturi. A throttle valve 25 in the form of a conventional butterfly is disposed in the passage. It includes a throttle shaft 26 and a disc-like butterfly plate 27. Rotating throttle shaft 26 varies the flow conditions in the passage, and is controllable to cause the carburetor to respond to the demands of the operator, all in accordance with known techniques.

A rim 28 on the body receives an air filter, air conduit, or other connections to atmospheric air.

As best shown in FIG. 1, throttle lever 30 is fixed to throttle shaft 26, so that turning lever 30 will turn the throttle valve.

Four identical fixed deflector vanes 31, 32, 33 and 34 are shown projecting from passage wall 35. They are all identical, so that only vane 31 will be described in detail. It projects inwardly from wall 35 and slopes in a downstream direction. It has an upstream facing face 36 and a downstream facing face 37, both of which faces project inwardly and slope downstream.

Four gas inlet ports 40, 41, 42 and 43 enter the passage through wall 35. They are directed radially inward, and are about as wide as the vanes. Thus, the vanes perform two functions relative to the airstream and to the incoming gaseous fuel.

First, by overhanding the gas ports, the vanes protect at least part of the gas stream from direct impingement by the airstream. Accordingly, the gas streams impinge on the downstream facing faces, and are directed toward the middle portion of the airstream between the free tip ends of the vanes. They are also given a downstream component, so as to enter and be more readily entrained in the central part of the airstream.

Second, those portions of the air stream which impinge on the upstream-facing faces of the vanes are directed inwardly and with a downstream component. These features result in a good mixing, especially near the central axis.

However, these vanes not only provide access for the gas to the central regions, but they pass a relatively slowly moving part of the stream in regions 45 between them. This air will readily mix with gas from the sides of the gas ports. Because of the turbulence at the center gas injected there will be incorporated as a part of a well-mixed stream in a short path length. A thoroughly mixed gas-air mixture is produced by this carburetor in less than one-half inch of axial travel in a throat of about 1¼ inches diameter.

A gas passage 50 enters the side of the body from a mounting pad 51. It branches to two conduits that in turn branch to a pair of plenums 52, 53 from which the gas ports exit. Closure plate 19a closes the bottom ends of plenums 52 and 53.

A metering valve 60 is mounted to mounting pad 51. It includes a body 60a having a gas inlet port 61 to be connected to a conduit from a regulator valve (not shown). It has a rotor passage 62 with a cylindrical wall 63 through which a valving port 64 exits to gas passage 50. Valving port 64 has a generally circular edge intersecting the wall of rotor passage 62. If desired, port 64 can be formed in a washer that can be removed and replaced, so that valving ports of different size and shape can be provided without modifying the body itself.

A cylindrical valve rotor 65 is rotatably fitted in the rotor passage. It includes a V-shaped transverse notch with shape sides 66, 67 and a flat bottom 68. The bottom is so disposed and arranged that when the metering valve is in its most-closed position (FIG. 4), there will still remain a small opening 69 at the bottom to gas passage 50. This provides limited gas flow for idling operation. Thus, the metering valve does *not* function as a shut-off valve. In its most-closed position it passes gas for idling operation and for starting operation.

The rotor provides for maximum output when the notch is placed for straight-across flow of gas (FIG. 5). Intermediate flow conditions will be determined by the shape of the notch and by the rotational position of the rotor in the rotor passage. The shapes of the notch edges will be empirically designed.

The rotor tends to be pressed toward valve port 64 by gas pressure. This provides an improved valving action, especially in the event of valve wear.

A rotor lever 70 is pinned to the rotor shaft. Turning lever 70 will turn the rotor. Pins 71, 72 are fixed to levers 30 and 70, respectively. There is a reference spacing 73 between the centers of the two shafts. A link 75 is provided to hold the centers of pins 71, 72 apart by this same spacing. The levers and link therefore move as a parallelogram system, so that the relationship between the setting of the throttle valve and of the metering valve are always precisely known. One or the other of the two shafts will ordinarily be turned by an external throttle linkage of no special importance to the invention. It will be adjustable relative to the carburetor by known connection means.

The rotor is provided with means to supply additional gas during starting operations when the metering valve is in its most-closed (idling) position. In the idling position, insufficient gas will be supplied for a starting operation, although enough will be supplied for a continuing idling operation.

It is possible, but not best practice, to start engines of this type with the throttle in an operating position. A better technique is to provide supplementary gas with the throttle closed and the metering valve in the idling position to get the engine started, and then open the throttle. For this purpose there is provided a starting by-pass system which is effective only in the throttle-closed (idling) setting, and with the manifold at pressures respective to starting efforts for supplementing the gas flow which gas flow passes through opening 69.

In this invention, a by-pass groove 80 extends along the rotor from a position that overlaps the inlet port, to the end of the rotor. The groove 80 has a central passage 81 in the rotor that terminates at a by-pass port 82 which is positioned where it discharges into the valving port, but only when the rotor is in its starting-idling position. Significant rotation of the rotor causes by-pass port to leave the valving port and thereby close the by-pass system.

Also in the passage 81 is a poppet 85, spring-loaded open by bias spring 86. Poppet 85 permits by-pass flow under starting conditions. However, when the engine starts, the resulting manifold vacuum will close the poppet to by-pass flow and closes the by-pass system.

The features of positioning the by-pass port, and of the poppet assure that the by-pass system will be closed except during staring operations with the throttle in its most-closed position. This conserves fuel that would otherwise be wasted in other conditions of operation.

The setting and construction of the metering valve and of the throttle valve are uniquely related to one another. Each of the levers can be set to adjust the lever position relative to its respective valve. Then these are locked so they move in unison. The parallelogram relationship places them in a true slave relationship.

However, there is a serious tendency for wear to occur in the linkages, such as in ball-type rod ends, and this is one of the reasons why frequent adjustments such as turnbuckles are required to keep carburetors of this type in proper operation. Especially for installations where such adjustments are rarely made, and where agency qualification requires long service without adjustments, linkage wear can render even an otherwise suitable carburetor unacceptable.

Existing linkages have not provided means to compensate for this wear in such a way as to maintain a constant and precise spacing between the centers of the linkage pins. This is not surprising because previous efforts have generally been to provide bearings which have minimum wear, at the ends of rigid links whose length is adjustable, perhaps by turnbuckles. As a consequence, eventually the linkage wears at its joints and becomes sloppy. The adjustment is lost.

This invention utilizes a linkage which is related not to the worn working surface, but to the centers of the pins. The pins are identical, and are presumed to undergo identical wear. The linkage comprises a pair of plates both of which embrace the two pins, and are diametrically opposed across both pins. Accordingly the links follow up any pin wear by moving diametrically to continue to embrace both pins, with the established spacing between centers maintained. That spacing is not adjustable. It is established when the metal is cut to form the links as will now be seen with reference to FIGS. 7–11.

Link 75, is shown merely as a simple plate in FIG. 1, because an improved linkage is not necessary for the enjoyment of the other features of this invention. However, in combination with the other features of this invention. However, in combination with the other feature it provides a greatly improved total carburetor whose advantages will be retained despite linkage wear.

Linkage 100, which is the presently-prefered embodiment, is shown in FIGS. 7 to 11. Its assembly is shown in FIG. 7 functioning to interconnect pins 71 and 72. Two identical link plates 101, 102 are arranged in flat sliding adjacency. It is important that certain of their dimensions be identical, and that their wear properties be identical. For that reason it is best to punch them from the same die and from the same run of material, usually a low carbon steel. Also, because the system is to adjust itself for wear, it is important that the pins themselves be of the same material and of the same dimensions. The equal wear of both pins and equal wear of both plates can logically be assumed. This is an assumption of this invention. In practice it has held true, and tests of significant duration have proved the effectiveness of this linkage.

As shown in FIGS. 8–11, plates 101, 102 are arranged head-to-toe. A tension-type bias spring 103 draws identical regions toward one another. Because both plates are identical, only plate 101 will be described in detail.

In FIGS. 8 and 9, it is assumed that link plate 101 as shown is overlaid flat on link 102 as shown. The same relationship is assumed in FIGS. 10 and 11.

Reverting to FIG. 8, link plate 101 has a keyhole slot 105 with an enlarged portion 106 sufficient to pass head 107 of pin 71, and a neck portion 108 of reduced width to receive the shank 109 of pin 71, but to retain the head 107 from out-of-plane separation. Its width is about equal to the diameter of the pin shank before wear occurs. A contact portion 110 at the end of the neck section has a radius about equal to the radius of shank 109 before it wears.

A slot 111 extends into the other end of the link plate. Its width is about equal to the diameter of shank 112 of pin 72 before the pin wears. A contact portion 113 has a radius about equal to the radius of the shank before the plate or the pin wears.

Reference spacing 114 is equal to reference spacing 73. It is the intended spacing to be maintained between the centers of the pins. Notice in FIG. 8 that the farthest to the right extremes of the contact portions 110 and 113 are spaced by the same dimension as reference spacing 73.

An aperture 120 extends along the plate to receive the convolutions of a tension-type coil spring 103. The coil spring has retention hooks 122, 123 which respectively hook over the edges of portions 106 of plates 101 and 102, thereby pulling all four contact portions against the pins so as identically to embrace both of the pins. The pins are thereby trapped at the reference spacing.

Now assume that wear occurs. FIGS. 10 and 11 show equally worn pin shanks, and unworn link plates. Notice that link 101 will be pulled to the left to bear against the right sides of both pins as shown in FIG. 10. Link 102 will be pulled to the right as shown in FIG. 11 to bear against both left sides. It is important to observe that both links moved equally, in opposite directions, and continue to embrace the pin shanks to hold them at the reference spacing.

Wear on the link plates is presumed to be equal at all contact surfaces. Accordingly, the "wear" extends in the same direction and to the same extent at both contact portions, so that they maintain the reference spacing. Thus, any combination of pin wear and link plate wear still results in maintenance of the reference spacing. Again, it is presumed that both pins wear equally, and that both link plates wear equally, although the rate of wear of the pins and of the plates may be and probably will be different. Slight difference between the pins or between the plates can result in some deviation from constant spacing, but it will still be better than the results attained when conventional rod ends and turnbuckles are used. They are very small, if they occur at all.

It is also presumed that the spring force is sufficient to overcome any drag of the shafts which might cause plate 101 to move to the right in FIG. 8 relative to plate 102 as shown in FIG. 9. The linkage can of course be overcome, but not by forces than can reasonably be anticipated in this device.

This linkage thereby requires no adjustment. The valves and their levers are identically adjusted with the linkage in place, and the levers are tightened in place. Thereafter adjustment is unnecessary.

The carburetor and linkage provide the advantages described with parts which can be die cast, machined or stamped to best advantage. The carburetor can function at very close to stoichiometric ratios, with negligible carbon monoxide emission. It can fit inside very restricted enclosures.

This invention is not to be limited to the embodiments shown in the drawings and described in the description, which are given by way of example and not of limitation, but only in accordance with the scope of the appended claims.

I claim:

1. A gaseous fuel carburetor comprising:
   a body having a passage wall forming a passage having an axis of downstream flow, an upstream air intake port, and a downstream mixture outlet port, said passage incorporating a reduced venturi between said ports;
   an adjustable throttle valve means in said passage, said throttle valve means including a rotatable throttle shaft to set the throttle valve means;
   said passage wall having a plurality of gas injector ports opening into said passage so as to discharge gas into said passage, and a plurality of deflector vanes on said passage wall, each vane of said plurality of deflector vanes being upstream from and overhanging a respective injector port, each said deflector vane having an upstream facing face, a downstream facing face and a free tip end, said faces extending from said wall into said passage, and sloping downstream, there being substantial spacings between the tip ends of said vanes and between said vanes to permit unimpeded axial flow of air past them; and
   a gas supply conduit connected to said gas injector ports for supplying gas to the injector ports.

2. A carburetor according to claim 1 in which a rotary metering valve is mounted to said body said rotary metering valve having an inlet port, a valving chamber, and a valving port in that order, said valving chamber having a cylindrical wall with a valving axis, said valving port being disposed in said valving chamber wall, a valve rotor rotatably mounted in said valving chamber, said rotor having a valving notch with a valving edge which in one rotary position provides only for minimal gas flow, and in other position provides for adjustable selectable gas flow, said valving port being connected to said gas supply conduit, and said inlet port being adapted to receive gas to be metered by said metering valve.

3. A carburetor according to claim 2 in which said throttle shaft and said valve rotor each have a respective center of rotation, the centers of rotation of said throttle shaft and of said valve rotor being spaced apart by a fixed reference spacing, a throttle lever fixed to said throttle shaft to rotate it, and a rotor lever fixed to said rotor to rotate it, a linkage pivotally attached to pivot pins disposed on both levers at pivot points equidistant from said centers of rotation to maintain the separation of the pivot points from one another substantially equal to the reference spacing and defining a separation axis, whereby the two shafts rotate simultaneously through substantially equal rotational angles.

4. A carburetor according to claim 3 in which said linkage comprises:
   a pair of identical plates held and laid in flat sliding adjacency to one another, each said plate having a pair of slots located at opposite ends of the plate defining contact surfaces facing in the same direction along the separation axis to engage a respective pin at a respective pivot point, and said plates being laid reversely relative to one another so the contact surfaces of one plate face toward the respective contact surfaces of the other plate, the contact surfaces on both plates being spaced apart by a distance equal to the reference spacing, and resilient bias means connected to said plates in tension so as to draw the contact surfaces against respective pivot pins disposed at said pivot points, and the pivot pins having identical dimensions in contact with said contact surfaces.

5. A carburetor according to claim 4 in which one of said pair of slots on each plate is a keyhole slot, and the other slot of said pair of slots on each plate is open at the opposite end of each plate.

6. A carburetor according to claim 2 in which said rotor further includes a by-pass circuit comprising:
   a groove on the rotor extending axially from a position within the inlet port when the valve is in said one rotary position for minimal gas flow to an end of the rotor, said groove including a bore extending from said end into the rotor and branching to an exit port in communication with the valving port when the valve rotor is in said one rotary position, and a spring-loaded poppet valve in said bore, said poppet valve being biased open when pressures respective to starting are presesnt at the valving port, and closed at substantially higher vacuum levels.

7. A carburetor according to claim 6 in which said valving port is in a removable plate.

8. A linkage in combination with two parallel levers for joining said two parallel levers, said levers being rotatable around and projecting from respective centers of rotation, each of said levers having a respective pin mounted at a distance from its respective center, said distances being equal, said linkage maintaining constant the spacing between the pins despite wear of the linkage or of the pins, said linkage comprising:

a pair of identical plates held and laid in flat sliding adjacency to one another, each of said plates having a pair of slots located at opposite ends of the plate defining contact surfaces facing in the same direction along a separation axis defined between the contact surfaces to engage a respective pin, and said plates being laid reversely relative to one another so the contact surfaces of one plate face toward the respective contact surfaces of the other plate, the contact surfaces on each of said plates being spaced apart by a distance equal to the reference spacing, and resilient bias means connected to said plates in tension so as to draw the contact surfaces against respective pins, and the pins having identical dimensions in contact with said contact surfaces.

9. A linkage according to claim 8 in which one of said pair of slots on each plate is a keyhole slot, and the other slot of said pair of slots on each plate is open at the opposite end of each plate.

10. A gaseous fuel carburetor comprising:

a body having a passage wall forming a passage having an axis of downstream flow, an upstream air intake port, and a downstream mixture outlet port, said passage incorporating a reduced venturi between said ports;

an adjustable throttle valve means in said passage, said throttle valve means including a rotatable throttle shaft to set the throttle valve means;

said passage wall having a plurality of gas injector ports opening into said passage so as to discharge gas into said passage;

a rotary metering valve mounted to said body, said metering valve having an inlet port, a valving chamber, and a valving port in that order, said valving chamber having a cylindrical wall with a valving axis said valving port being disposed in said valving chamber wall, a valve rotor rotatably mounted in said valving chamber, said valve port being connected to said gas supply conduit, and said inlet port being adapted to receive gas to be metered by said metering valve.

said throttle shaft and said valve rotor each having a respective center or rotation, the centers of rotation of said throttle shaft and of said valve rotor being spaced apart by a fixed reference spacing, a throttle lever being fixed to said throttle shaft to rotate it, and a rotor lever being fixed to said rotor to rotate it; and a linkage pivotally attached to pivot pins and disposed on both levers at pivot points equally distant from said centers of rotation to maintain the separation of the pivot points from one another substantially equal to the reference spacing and defining a separation axis, whereby the two shafts rotate simultaneously through substantially equal rotation angles, said linkage comprising a pair of identical plates held in and laid in flat sliding adjacency to one another, each of said plates having a pair of slots located at opposite ends of the plate defining contact surfaces facing in the same direction along the separation axis to engage a respective pin at a respective pivot point, and said plates being laid reversely relative to one another so that the contact surfaces of one plate face toward the respective contact surfaces of the other plate, the contact surfaces on both plates being spaced apart by a distance equal to the reference spacing, and resilient bias means connected to said plates in tension so as to draw the contact surfaces against respective pivot pins, and the pivot pins having identical dimensions in contact with said contact surfaces.

* * * * *